US006604723B2

United States Patent
Rose et al.

(10) Patent No.: US 6,604,723 B2
(45) Date of Patent: Aug. 12, 2003

(54) MONITOR AND KEYBOARD MOUNT FOR AUTOMATED SOLDER PASTE INSPECTION SYSTEM

(75) Inventors: Steven A. Rose, Minneapolis, MN (US); John T. McElreath, Mahtomedi, MN (US)

(73) Assignee: CyberOptics Corporation, Golden Valley, MN (US)

( * ) Notice: Subject to any disclaimer, the term of this patent is extended or adjusted under 35 U.S.C. 154(b) by 0 days.

(21) Appl. No.: 09/803,413

(22) Filed: Mar. 9, 2001

(65) Prior Publication Data

US 2002/0125390 A1 Sep. 12, 2002

(51) Int. Cl.[7] ................................. E04G 3/00
(52) U.S. Cl. ................. 248/279.1; 248/125.2; 248/281.11; 248/125.3; 248/918; 248/920; 248/917
(58) Field of Search ............ 248/281.11, 125.2, 248/279.1, 125.3, 122.1, 125.1, 178.1, 295.11, 918, 919, 920, 121, 124.1, 917, 297.21, 297.31, 296.1, 292.12; 108/147, 106, 95, 96, 147.11

(56) References Cited

U.S. PATENT DOCUMENTS

| | | | | |
|---|---|---|---|---|
| 1,335,446 A | * | 3/1920 | McDaniel | 248/292.12 |
| 3,399,856 A | * | 9/1968 | Pecaut | 248/279 |
| 4,516,751 A | * | 5/1985 | Westbrook | 248/276 |
| 4,880,270 A | * | 11/1989 | Cooper | 297/188 |
| 5,630,566 A | * | 5/1997 | Case | 248/122.1 |
| 5,758,849 A | * | 6/1998 | Bui et al. | 248/125.1 |
| 5,918,841 A | * | 7/1999 | Sweere et al. | 248/123.11 |
| 6,045,179 A | * | 4/2000 | Harrison | 297/188.2 |

OTHER PUBLICATIONS

US2002/0017595A1, Koyanagi, Ergonomic Laptop Computer Support Assembly, US patent and Trademark Office, see figure 5.*

"SE 300," CYBEROPTICS, 4 pages (Jan. 2001).

* cited by examiner

Primary Examiner—Kimberly Wood
(74) Attorney, Agent, or Firm—Westman, Champlin & Kelly, P.A.

(57) ABSTRACT

A keyboard and monitor mount assembly includes an extruded body, a slide support, a support arm and a mounting member. The extruded body is adapted to mount to a solder paste inspection machine and includes at least one channel. The slide support is slidable within the channel. The support arm is pivotally attached to the slide support. The mounting member is coupled to an end of the support arm and is adapted to support either a keyboard or a monitor.

7 Claims, 3 Drawing Sheets

MONITOR AND KEYBOARD MOUNT FOR AUTOMATED SOLDER PASTE INSPECTION SYSTEM

CROSS REFERENCE TO RELATED APPLICATIONS

The present application claims priority of U.S. design patent application Ser. No. 29/130,619, filed Oct. 5, 2000, entitled SOLDER PASTE INSPECTION MACHINE.

COPYRIGHT RESERVATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Field of the Invention

The present invention relates to automated solder paste inspection systems, and in particular to an automated solder paste inspection system with an improved keyboard and monitor mount.

2. Background of the Invention

Solder paste inspection machines are used to inspect solder patterns on electronic printed circuit cards during manufacture of electronic assemblies. As well appreciated by those knowledgeable in the industry, at an intermediate stage of manufacture, the printed circuit cards may have hundreds or thousands of small solder deposits which are electrically coupled to circuit paths printed within the card. When electrical components are later mounted on the card, the solder is melted to form electrical connections between the circuit paths in the card and pins, wires, or other conductors from the components. The increasing complexity of the information age demands that these components have larger and larger numbers of connections, usually within smaller and smaller areas. An insufficient amount of solder at a connection site may result in a failure to make the connection, or a connection that intermittently fails or fails after some time in the field. Excess solder or misplaced solder can similarly wreak havoc with the resulting product. The size and number of such connections places great demands on the consistency of the manufacturing process. It also makes it difficult to inspect a card for defects. At the same time, the cost of an undetected defect can be large. Accordingly, there is substantial potential benefit in an automated process which can accurately inspect solder patterns quickly and without damage to the card.

Due to the significant advantages that automated solder paste inspection systems have provided, they are being increasingly used in place of manual inspection. For each inspection cycle, an operator must generally open the inspection machine and place a card or cards to be inspected within the machine; close the machine; run the inspection; review the results; and remove the card or cards. In order to run the inspection and review the results, the operator must interact with the computer(s) within the system. Thus, it is necessary for the operator to use input devices such as a keyboard and mouse, as well as output devices such as a computer monitor. However, when the operator removes the tested cards, and inserts new cards to be tested, the input/output devices can sometimes get in the way. A keyboard/monitor mount for a solder paste inspection machine that reliably facilitates keyboard and monitor movement would enhance system throughput. Further, systems that do not provide adjustment of keyboard and monitor positioning may not optimally accommodate all operators since operator size varies.

SUMMARY OF THE INVENTION

A keyboard and monitor mount assembly includes an extruded body, a slide support, a support arm and a mounting member. The extruded body is adapted to mount to a solder paste inspection machine and includes at least one channel. The slide support is slidable within the channel. The support arm is pivotally attached to the slide support. The mounting member is coupled to an end of the support arm and is adapted to support either a keyboard or a monitor.

DETAILED DESCRIPTION OF THE PREFERRED EMBODIMENTS

Figure 1:
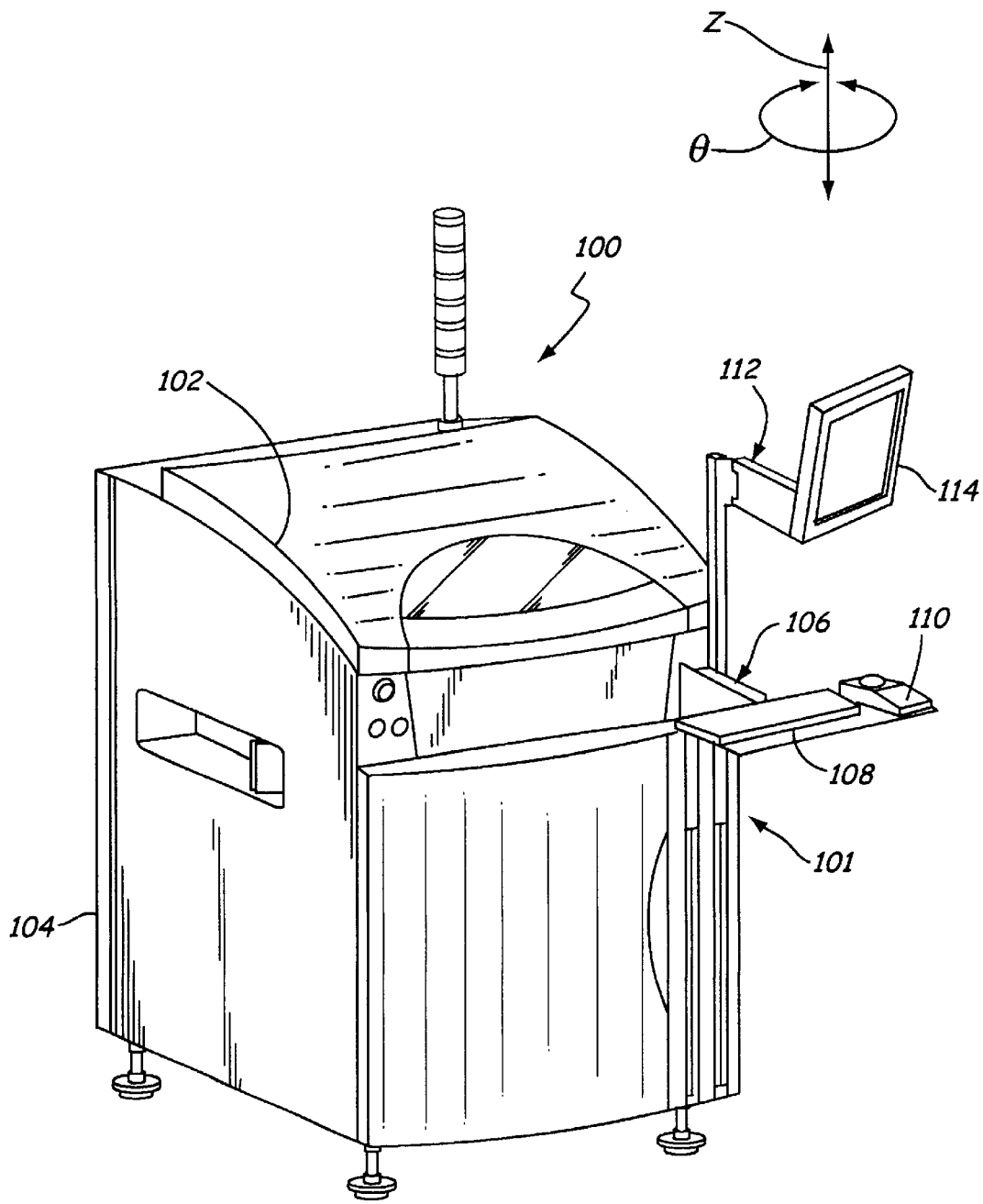
FIG. 1 is a perspective view of a solder paste inspection machine having a keyboard/monitor mount in accordance with an embodiment of the present invention.

FIG. 1 is a perspective view of a solder paste inspection machine 100 having a keyboard/monitor mount assembly 101 in accordance with an embodiment of the present invention. Machine 100 includes cover 102, base 104, keyboard mount 106, keyboard 108, pointing device 110, monitor mount 112, and monitor 114. Cover 102 rotates upwardly to allow access to the inspection area (not shown). The operator only opens cover 102 to remove boards deemed defective. Boards enter and exit the machine via conveyors that protrude through the side skins, as shown in FIG. 1. The operator then closes cover 102, and engages the inspection cycle through keyboard 108 or pointing device 110, which is preferably a trackball. The results of the inspection are indicated to the operator via monitor 114, which is preferably a flat panel display, as shown. Preferably keyboard mount 106 and monitor mount 112 are attached to machine base 104, and allow both vertical (z-axis) and rotational ($\theta$) movement of the keyboard and monitor.

Figure 2:
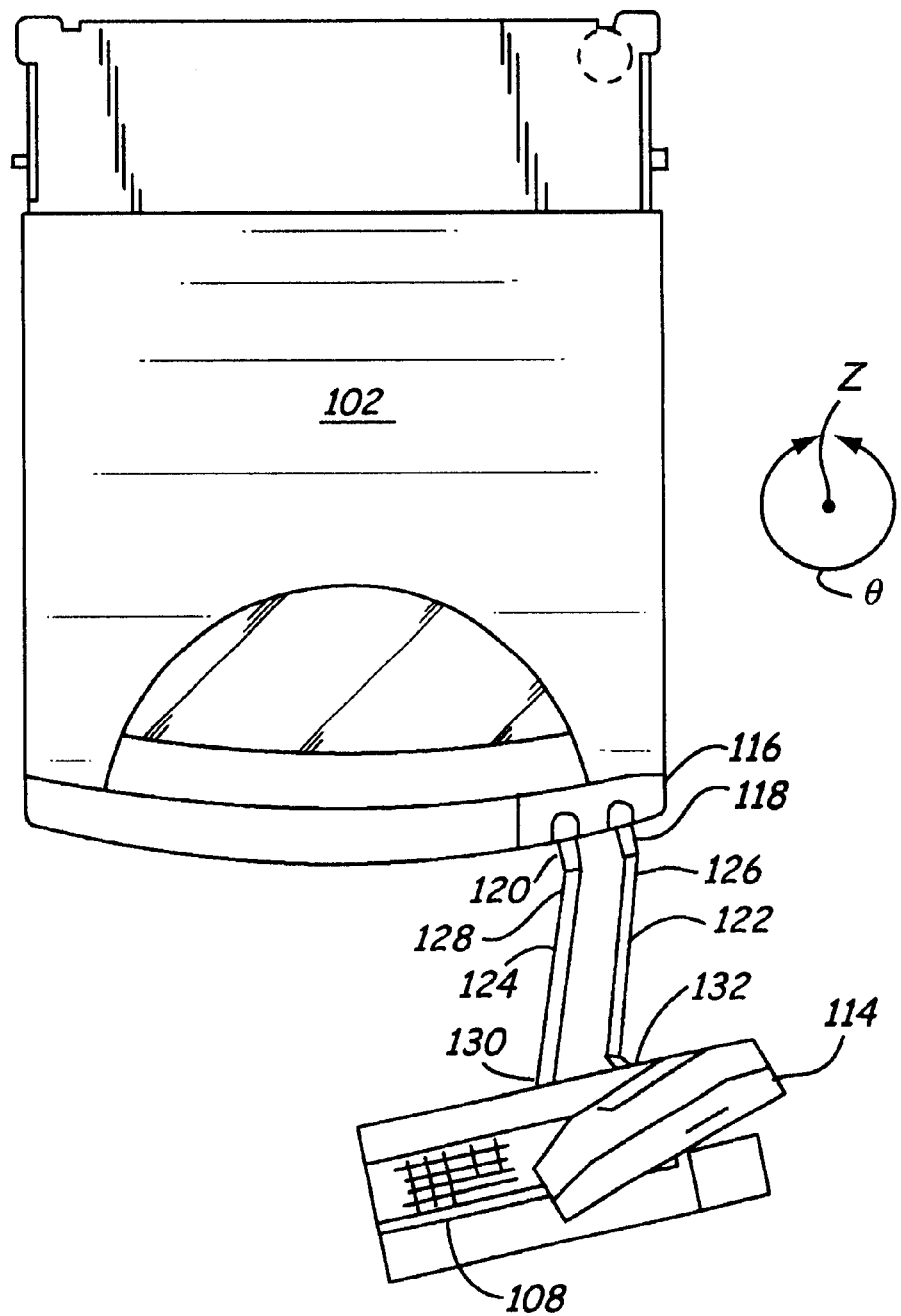
FIG. 2 is a top plan view of a solder paste inspection machine having a keyboard/monitor mount in accordance with an embodiment of the present invention.

Cables for monitor 114, keyboard 108, and pointing device 110, retained by 150, 151, 152. These components provide protection and allow for free movement of all assemblies through their adjustment range FIG. 2 is a top plan view solder paste inspection machine 100 having a keyboard/monitor mount in accordance with an embodiment of the present invention. Body 116 is mounted to base 104 of machine 100 and supports slides 118 and 120. Arms 122 and 124 are preferably rotatably attached to slides 118 and 120, respectively. Arms 122 and 124 pivot about points 126 and 128, respectively. Keyboard mounting member 130 is disposed upon the end of arm 124, and monitor mounting member 132 is disposed upon the end of arm 122. Members 130 and 132 are rotatably coupled to their respective arms through pivot points that allow additional $\theta$ rotation. Thus, each of keyboard 108 and monitor 114 may be swung about their respective arm pivots 128, 130; and 126, 132.

Figure 3:
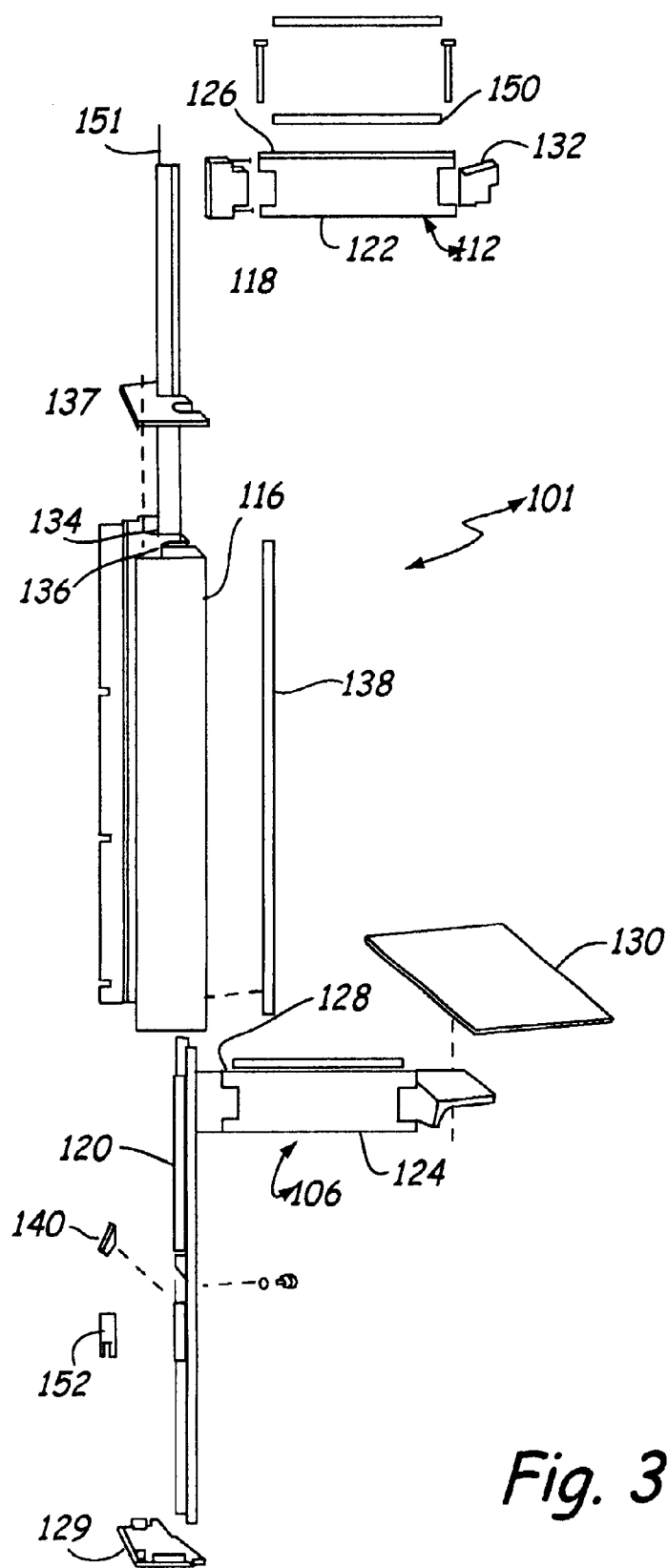
FIG. 3 is an exploded side elevation view of a keyboard/monitor mount in accordance with embodiments of the present invention.

FIG. 3 is an exploded side elevation view of keyboard/monitor mount assembly 101 in accordance with embodiments of the present invention. Mount assembly 101 includes body 116 to which monitor mount 112 and keyboard mount 106 are attached. Body 116 is preferably formed of extruded metal such as aluminum. Body 116 includes a pair of channels 134, 136. Endcaps 137 and 139 are preferably placed on opposite ends of body 116 to prevent debris from falling into body 116, for retaining plastic bearings, and for aesthetics. Support slides 118, 120, which are also preferably formed by extrusion, are slidable within channels 134, 136, respectively, to provide independent height adjustment for the monitor and keyboard. Locking mechanisms are provided to fix the height once it has been appropriately selected. For example, sawtooth member 138 and latch 140 cooperate to provide adjustable keyboard height.

Latch 140 is loaded with a compression spring (shown) that prevents a free fall of 118 or 120. If the operator releases the sawtooth, 118 and 120 can only fall the distance of one tooth, due to the spring loading of the latch. However, those skilled in the art will recognize that numerous options exist for locking relative movement between channels 134, 136 and their respective slides. For example, setscrews could be mounted within body 116 and driven to engage the slides thereby locking the slides with respect to body 116. Support arms 122 and 124 are pivotally attached to support slides 118, 120, respectively. Mounting members 130, 132 are coupled, preferably pivotally, to ends of support arms 122 and 124 in order to mount the keyboard and monitor. Monitor 114 is disposed relative to mounting member 132 and keyboard 108 and pointing device 110 are disposed relative mounting member 130.

The sliding height adjustment and extruded nature of the components synergistically provide smooth height adjustment using simple low-cost components. The multiple pivots provided in each of the monitor mount and keyboard mount add advantageous degrees of freedom thereby facilitating machine operation and enhancing throughput.

Although the present invention has been described with reference to preferred embodiments, workers skilled in the art will recognize that changes may be made in form and detail without departing from the spirit and scope of the invention.

What is claimed is:

1. A keyboard and monitor mount assembly comprising:

an extruded body adapted to mount to a solder paste inspection machine, the body having at least two channels therein;

a first slid support slidable within a first channel;

a first support arm pivotally attached to the first slide support;

a first mounting member coupled to an end of the first support arm, the first mounting member adapted to support a keyboard;

a second slide support slidable within a second channel of the body;

a second support arm pivotally attached to the second slide support;

a second mounting member coupled to an end of the second support arm, the second mounting member adapted to support a monitor;

a sawtooth member coupled to the body; and a latch coupled to the first slide support, the latch cooperating with the sawtooth member to provide selectable height adjustment.

2. The assembly of claim 1 wherein the body is formed of aluminum.

3. The assembly of claim 1, wherein the first mounting member is pivotally coupled to the first support arm.

4. The assembly of claim 1, wherein the second mounting member is pivotally coupled to the second support arm.

5. The assembly of claim 1, and further comprising a keyboard disposed relative to the second mounting member.

6. The assembly of claim 1, and further comprising a monitor disposed relative to the second mounting member.

7. The assembly of claim 6, wherein the monitor is a flat panel display.

\* \* \* \* \*

UNITED STATES PATENT AND TRADEMARK OFFICE
CERTIFICATE OF CORRECTION

PATENT NO. : 6,604,723 B2  Page 1 of 1
DATED : August 12, 2003
INVENTOR(S) : Rose et al.

It is certified that error appears in the above-identified patent and that said Letters Patent is hereby corrected as shown below:

Column 4,
Line 7, "slid" should be -- slide --

Signed and Sealed this

Sixth Day of July, 2004

JON W. DUDAS
*Acting Director of the United States Patent and Trademark Office*